United States Patent
Popeil

(10) Patent No.: US 10,412,981 B2
(45) Date of Patent: Sep. 17, 2019

(54) SYSTEM AND METHOD FOR DEEP FRYING POULTRY WHILE AVOIDING SKIN DAMAGE

(71) Applicant: Ronald M. Popeil, Beverly Hills, CA (US)

(72) Inventor: Ronald M. Popeil, Beverly Hills, CA (US)

(73) Assignee: Ronald M. Popeil, Beverly Hills, CA (US)

( * ) Notice: Subject to any disclaimer, the term of this patent is extended or adjusted under 35 U.S.C. 154(b) by 328 days.

(21) Appl. No.: 15/443,186

(22) Filed: Feb. 27, 2017

(65) Prior Publication Data

US 2018/0242617 A1 Aug. 30, 2018

(51) Int. Cl.
*A23L 5/10* (2016.01)
*A47J 37/12* (2006.01)
*A23L 13/50* (2016.01)

(52) U.S. Cl.
CPC ............... *A23L 5/11* (2016.08); *A23L 13/55* (2016.08); *A47J 37/1204* (2013.01); *A47J 37/1295* (2013.01); *A23V 2002/00* (2013.01)

(58) Field of Classification Search
CPC ........................................................ A23L 5/11
USPC ......... 99/337, 339, 403, 645, 447, 340, 417; 126/383.1, 385.1, 386.1, 369, 93; 219/441; 426/33
See application file for complete search history.

(56) References Cited

U.S. PATENT DOCUMENTS

| | | |
|---|---|---|
| 91,899 A | 6/1869 | Beaumont |
| 92,791 A | 7/1869 | Burwell |
| 213,244 A | 3/1879 | Pettibone |
| 274,208 A | 3/1883 | Mayo |
| 300,691 A | 6/1884 | Brown |
| 474,036 A | 5/1892 | Wood |
| 475,840 A | 5/1892 | Woods |
| 475,874 A | 5/1892 | Leggett |
| 498,992 A | 6/1893 | Schilling |
| 499,615 A | 6/1893 | Walker |
| 502,622 A | 8/1893 | Goldsmith |
| 633,423 A | 9/1899 | Burns |
| 641,267 A | 1/1900 | Cahill |
| 661,681 A | 11/1900 | Ashbaugh et al. |
| 703,331 A | 6/1902 | Acree |
| 895,856 A | 8/1908 | Harton |
| 900,396 A | 10/1908 | Lange |
| 910,812 A | 1/1909 | Harton |
| 951,241 A | 3/1910 | Hampel |
| 959,715 A | 5/1910 | Carson |
| 1,012,877 A | 12/1911 | Mahan |
| 1,199,211 A | 9/1916 | Simons |
| 1,205,026 A | 11/1916 | Rodgers |

(Continued)

*Primary Examiner* — Lori L Baker
(74) *Attorney, Agent, or Firm* — Ulmer & Berne LLP

(57) ABSTRACT

A system and method for cooking a food item, such as poultry, includes heating cooking fluid in a cooking vessel to a temperature sufficient to cook poultry and placing the poultry on a substantially horizontal perforate plate, breast down, such that the poultry is at least partially immersed in the cooking fluid. The perforate plate prevents poultry skin from sticking to a support, such as a deep fry cooking basket. The immersed poultry is cooked for a selected cooking period and then removed, along with the perforate plate from the cooking fluid. The poultry is then removed from contact with the perforate plate.

17 Claims, 9 Drawing Sheets

(56) References Cited

U.S. PATENT DOCUMENTS

| | | | |
|---|---|---|---|
| 1,214,992 A | 3/1917 | Boleratz | |
| 1,263,151 A | 4/1918 | Topalian | |
| 1,264,348 A | 4/1918 | Toth | |
| 1,302,086 A | 4/1919 | Pitlick | |
| 1,315,665 A | 9/1919 | Hamilton | |
| 1,371,718 A | 3/1920 | Zimmermann | |
| 1,368,640 A | 2/1921 | Melchior | |
| 1,462,275 A | 5/1921 | Gemmel | |
| 1,396,606 A | 11/1921 | Vincent | |
| 1,430,691 A | 10/1922 | Self et al. | |
| 1,461,654 A | 7/1923 | Haessler | |
| 1,487,824 A | 3/1924 | Vincent | |
| 1,538,171 A | 5/1925 | Dailey | |
| 1,563,005 A | 11/1925 | Allee | |
| 1,577,856 A | 3/1926 | Wingert | |
| 1,635,563 A | 7/1927 | Sanford | |
| 1,638,446 A | 8/1927 | Bel | |
| 1,662,147 A | 3/1928 | Farden | |
| 1,733,261 A | 10/1929 | Rigby et al. | |
| 1,842,101 A | 1/1932 | Kaufmann | |
| 1,881,549 A | 10/1932 | Hatch | |
| 2,061,533 A | 12/1934 | Anetsberger | |
| 2,081,751 A | 10/1935 | Lendrum | |
| 2,112,990 A | 11/1936 | Hunter | |
| 2,247,650 A | 9/1940 | Carlson | |
| 2,250,910 A | 7/1941 | Hiett | |
| 2,315,473 A | 3/1943 | Wolcott | |
| 2,509,533 A | 5/1950 | Schoen, Jr. | |
| 2,517,759 A | 8/1950 | Bentzen | |
| 2,560,229 A | 7/1951 | Leavens | |
| 2,563,237 A | 8/1951 | Grocoff | |
| 2,577,433 A | 12/1951 | Robb | |
| 2,625,972 A | 1/1953 | Torres | |
| 2,645,262 A | 7/1953 | Marasco | |
| 2,915,000 A | 1/1954 | Hetzel et al. | |
| 2,703,522 A | 3/1955 | Smith | |
| 2,703,670 A | 3/1955 | Voight | |
| 2,751,120 A | 6/1956 | Bond et al. | |
| 2,786,502 A | 3/1957 | Turner | |
| 2,811,181 A | 10/1957 | Correll | |
| 2,835,191 A | 5/1958 | Clurman | |
| 2,836,212 A | 5/1958 | Shaw | |
| 2,855,893 A | 10/1958 | Greer et al. | |
| 2,897,776 A | 8/1959 | Black et al. | |
| 2,902,062 A | 9/1959 | Smekal | |
| D193,754 S | 10/1962 | Popeli | |
| 3,063,843 A | 11/1962 | Hashimoto | |
| 3,095,326 A | 6/1963 | Green et al. | |
| 3,112,781 A | 12/1963 | Popeil | |
| 3,116,770 A | 1/1964 | Tanuma | |
| 3,128,810 A | 4/1964 | Whipp | |
| 3,145,743 A | 8/1964 | Cronheim | |
| 3,201,015 A | 8/1965 | Wagaman | |
| 3,211,195 A | 10/1965 | Porter | |
| 3,216,474 A | 11/1965 | Popeil | |
| 3,225,735 A | 12/1965 | Arcabasso | |
| 3,283,730 A | 11/1966 | Mohler | |
| 3,327,621 A | 6/1967 | Zysset | |
| 3,354,546 A | 11/1967 | Pagliuca | |
| 3,394,677 A | 7/1968 | Taylor et al. | |
| 3,404,659 A | 10/1968 | Croston | |
| 3,438,353 A | 4/1969 | Pellegrini | |
| 3,463,077 A | 8/1969 | Lescure | |
| 3,468,355 A | 9/1969 | Hall | |
| 3,469,561 A | 9/1969 | Gordon | |
| 3,547,075 A | 12/1970 | Johnson | |
| 3,554,253 A | 1/1971 | Vasile | |
| 3,561,511 A | 2/1971 | Kummer | |
| 3,592,668 A * | 7/1971 | Denk | A47J 27/16 |
| | | | 126/369 |
| 3,626,840 A | 12/1971 | Day | |
| 3,641,923 A | 2/1972 | Wilkinson | |
| 3,667,374 A | 6/1972 | Holmes | |
| 3,696,778 A | 10/1972 | Moore | |
| 3,714,889 A | 2/1973 | Mazzola et al. | |
| D226,940 S | 5/1973 | Lax | |
| 3,735,726 A | 5/1973 | Butler | |
| 3,739,743 A | 6/1973 | McKee, Jr. | |
| 3,800,649 A | 4/1974 | Chinn | |
| 3,800,692 A | 4/1974 | Simens | |
| 3,808,963 A | 5/1974 | Ludena | |
| 3,816,703 A | 6/1974 | Binks | |
| 3,830,151 A | 8/1974 | Gerson | |
| 3,869,972 A | 3/1975 | Chase | |
| 3,874,429 A | 4/1975 | LaFarge | |
| 3,885,519 A | 5/1975 | Orlowski | |
| 3,939,884 A | 2/1976 | Mader | |
| 3,971,307 A | 7/1976 | Graham | |
| 4,001,451 A * | 1/1977 | Veeneman | A47J 37/047 |
| | | | 426/438 |
| 4,062,260 A | 12/1977 | Steinhogl | |
| 4,062,387 A | 12/1977 | Peniche | |
| 4,095,518 A | 6/1978 | Jones | |
| 4,108,222 A | 8/1978 | Kaufman | |
| 4,140,160 A | 2/1979 | Glackin | |
| 4,143,690 A | 3/1979 | Dunicz | |
| 4,157,707 A | 6/1979 | Schwind et al. | |
| 4,164,174 A | 8/1979 | Wallsten | |
| 4,170,252 A | 10/1979 | Peterson | |
| 4,189,993 A | 2/1980 | Kaufman | |
| 4,202,386 A | 5/1980 | Orr | |
| 4,230,238 A | 10/1980 | Wilson | |
| 4,256,154 A | 3/1981 | Black | |
| 4,266,813 A | 5/1981 | Oliver | |
| 4,317,017 A | 2/1982 | Bowen | |
| 4,397,299 A | 8/1983 | Taylor et al. | |
| 4,397,879 A | 8/1983 | Wilson | |
| 4,399,743 A | 8/1983 | Izzi, Sr. | |
| 4,401,017 A | 8/1983 | Feld | |
| 4,436,025 A | 3/1984 | Jones | |
| 4,462,308 A | 7/1984 | Wang | |
| 4,485,831 A | 12/1984 | Ungerleider | |
| 4,509,412 A | 4/1985 | Whittenburg et al. | |
| 4,557,378 A | 12/1985 | Klebold | |
| 4,569,280 A | 2/1986 | D'Ambro et al. | |
| 4,573,384 A | 3/1986 | Jones | |
| 4,580,549 A | 4/1986 | Sato | |
| 4,602,612 A | 7/1986 | Schwizer | |
| 4,604,989 A | 8/1986 | Kita | |
| 4,623,544 A | 11/1986 | Highnote | |
| 4,668,390 A | 5/1987 | Hurley et al. | |
| 4,688,475 A | 8/1987 | Witt et al. | |
| 4,691,096 A | 9/1987 | Knauss | |
| 4,698,861 A | 10/1987 | Bogusz | |
| 4,706,719 A | 11/1987 | Eversdijk | |
| 4,738,246 A | 4/1988 | Aylott et al. | |
| 4,739,698 A | 4/1988 | Allaire | |
| 4,789,017 A | 12/1988 | Panasewicz et al. | |
| 4,793,324 A * | 12/1988 | Caferro | A21B 1/02 |
| | | | 126/369 |
| 4,804,026 A | 2/1989 | Bailey | |
| 4,823,848 A | 4/1989 | Sentmore, Sr. et al. | |
| 4,832,095 A | 5/1989 | Bonnell | |
| 4,838,244 A | 6/1989 | Giles, Sr. et al. | |
| 4,850,403 A | 7/1989 | Wiese | |
| 4,852,256 A | 8/1989 | Schoettler | |
| 4,854,227 A | 8/1989 | Koopman | |
| 4,896,707 A | 1/1990 | Cowles | |
| 4,911,068 A | 3/1990 | Koether et al. | |
| 4,955,271 A | 9/1990 | Boutin-Lester | |
| 4,957,039 A | 9/1990 | Reyes | |
| 4,995,312 A | 2/1991 | Leiros | |
| 5,022,773 A | 6/1991 | Waldinger et al. | |
| 5,033,452 A | 7/1991 | Loyd et al. | |
| 5,078,189 A | 1/1992 | Ronsonet | |
| 5,097,753 A | 3/1992 | Naft | |
| 5,134,956 A | 8/1992 | Stewart | |
| 5,140,711 A | 8/1992 | Johnson | |
| 5,142,973 A | 9/1992 | Tur et al. | |
| 5,148,655 A | 9/1992 | Salinas | |
| 5,168,908 A | 12/1992 | Boyum | |
| 5,172,328 A | 12/1992 | Cahlander et al. | |
| 5,211,105 A * | 5/1993 | Liu | A47J 37/01 |
| | | | 126/348 |

(56) References Cited

U.S. PATENT DOCUMENTS

| | | |
|---|---|---|
| 5,230,279 A | 7/1993 | McFadden et al. |
| 5,245,902 A | 9/1993 | Pereira |
| 5,271,317 A | 12/1993 | Aguerrevere et al. |
| 5,277,233 A | 1/1994 | Fleming |
| 5,287,798 A | 2/1994 | Takeda |
| 5,373,781 A | 12/1994 | Knasel |
| 5,375,512 A | 12/1994 | Ertmer |
| 5,385,180 A | 1/1995 | Wittman |
| 5,421,249 A | 6/1995 | Repisky et al. |
| 5,431,092 A | 7/1995 | Guillory |
| 5,458,168 A | 10/1995 | Lindgren |
| 5,463,943 A | 11/1995 | Knasel |
| 5,515,892 A | 5/1996 | Najafi et al. |
| 5,535,793 A | 7/1996 | Tantre |
| 5,542,347 A | 8/1996 | Joseph |
| 5,584,235 A | 12/1996 | DuBois et al. |
| 5,586,486 A | 12/1996 | Nitschke et al. |
| 5,607,004 A | 3/1997 | Cope |
| 5,638,873 A | 6/1997 | Burns |
| 5,655,580 A | 8/1997 | Schrock |
| D388,665 S | 1/1998 | So |
| 5,718,934 A | 2/1998 | Hayakawa |
| 5,762,120 A | 6/1998 | Smith |
| 5,770,252 A | 6/1998 | McEwen et al. |
| 5,787,944 A | 8/1998 | Sarkis et al. |
| 5,816,139 A | 10/1998 | Scorta Paci |
| 5,826,494 A | 10/1998 | Wang |
| 5,836,238 A | 11/1998 | Kobayashi |
| 5,857,504 A | 1/1999 | Tremblay |
| 5,899,246 A | 5/1999 | Cummins et al. |
| 5,920,916 A | 7/1999 | Norton |
| 5,927,353 A | 7/1999 | Persson et al. |
| 5,947,016 A | 9/1999 | Repac et al. |
| 5,950,697 A | 9/1999 | Hobbs |
| 5,971,690 A | 10/1999 | Whitten |
| D415,937 S | 11/1999 | Robinson |
| 5,979,516 A | 11/1999 | Grant |
| 5,988,046 A | 11/1999 | Noil |
| 5,988,048 A | 11/1999 | Hunter et al. |
| 5,994,672 A | 11/1999 | Mestnik |
| 6,029,566 A | 2/2000 | McLemore |
| 6,035,907 A | 3/2000 | DeCoster |
| 6,079,319 A | 6/2000 | Doria |
| 6,082,249 A | 7/2000 | Su |
| 6,092,547 A | 7/2000 | Komiya et al. |
| 6,116,299 A | 9/2000 | Cummins et al. |
| 6,119,739 A | 9/2000 | McGee et al. |
| 6,131,564 A | 10/2000 | Song |
| 6,142,064 A | 11/2000 | Backus et al. |
| 6,142,193 A | 11/2000 | Sanders |
| 6,152,198 A | 11/2000 | Nguyen |
| 6,162,481 A | 12/2000 | Bernacchi et al. |
| 6,167,799 B1 | 1/2001 | Macias |
| 6,170,390 B1 | 1/2001 | Backus et al. |
| 6,173,645 B1 | 1/2001 | Backus et al. |
| 6,180,394 B1 | 1/2001 | Ishizaki et al. |
| 6,187,355 B1 | 2/2001 | Akoh et al. |
| 6,223,792 B1 | 5/2001 | Siagle |
| 6,240,838 B1 | 6/2001 | Backus et al. |
| 6,244,170 B1 | 6/2001 | Whited et al. |
| 6,250,214 B1 | 6/2001 | Backus et al. |
| 6,253,665 B1 | 7/2001 | Backus et al. |
| 6,254,790 B1 | 7/2001 | King et al. |
| 6,255,636 B1 | 7/2001 | Cochran, II et al. |
| 6,260,590 B1 | 7/2001 | Ziegmann |
| 6,269,737 B1 | 8/2001 | Rigney et al. |
| 6,289,795 B1 | 9/2001 | McLemore et al. |
| 6,330,855 B2 | 12/2001 | Backus et al. |
| 6,341,631 B1 | 1/2002 | Hobbs |
| 6,371,014 B1 | 4/2002 | Ismail et al. |
| 6,393,972 B1 | 5/2002 | Backus et al. |
| 6,398,066 B1 | 6/2002 | Mullins |
| 6,405,765 B1 | 6/2002 | Handrick |
| 6,408,742 B2 | 6/2002 | Backus et al. |
| 6,422,136 B1 | 7/2002 | Backus et al. |
| 6,450,219 B1 | 9/2002 | Ingram |
| 6,478,614 B1 | 11/2002 | De'Longhi |
| RE37,955 E | 1/2003 | Kiczko et al. |
| 6,513,668 B1 | 2/2003 | Masterton |
| 6,527,570 B1 | 3/2003 | Hartman et al. |
| 6,536,334 B2 | 3/2003 | Backus et al. |
| 6,539,838 B1 | 4/2003 | Bengtsson et al. |
| 6,568,315 B2 | 5/2003 | Backus et al. |
| 6,568,942 B2 | 5/2003 | Lau et al. |
| 6,619,191 B2 | 9/2003 | Mariotti |
| 6,638,076 B2 | 10/2003 | Wang |
| 6,688,347 B1 | 2/2004 | Selby |
| 6,708,738 B2 | 3/2004 | Olsen |
| 6,719,576 B2 | 4/2004 | Hartman et al. |
| 6,736,130 B2 | 5/2004 | Takahashi |
| 6,739,363 B2 | 5/2004 | Walter et al. |
| 6,742,445 B2 | 6/2004 | Backus et al. |
| 6,758,209 B2 | 7/2004 | Takeda et al. |
| 6,758,308 B1 | 7/2004 | Hearting et al. |
| 6,776,201 B2 | 8/2004 | Willis |
| 6,782,805 B2 | 8/2004 | Backus et al. |
| 6,782,806 B2 | 8/2004 | Backus et al. |
| 6,783,276 B2 | 8/2004 | Machacek et al. |
| 6,783,685 B2 | 8/2004 | Hwang |
| 6,786,139 B2 | 9/2004 | Ponting et al. |
| 6,786,215 B1 | 9/2004 | Moravec et al. |
| 6,831,185 B2 | 12/2004 | Ikuina et al. |
| 6,837,150 B2 | 1/2005 | Backus et al. |
| 6,865,983 B2 | 3/2005 | McNamee |
| 6,921,480 B2 | 7/2005 | Post |
| 6,935,389 B1 | 8/2005 | Rinaldi |
| 6,941,857 B2 | 9/2005 | McLemore |
| 6,976,882 B2 | 12/2005 | Kernan |
| 6,988,445 B1 | 1/2006 | Backus et al. |
| 6,998,581 B2 | 2/2006 | Currie |
| 7,012,271 B2 | 3/2006 | Wnek et al. |
| 7,013,934 B1 | 3/2006 | Hicok |
| 7,036,425 B2 * | 5/2006 | Chang ............... A47J 37/1219 99/336 |
| 7,044,049 B2 | 5/2006 | Johnston, Sr. et al. |
| 7,053,338 B1 | 5/2006 | Tesfagaber |
| 7,065,883 B2 | 6/2006 | Popeil et al. |
| 7,074,046 B2 | 7/2006 | Kernan |
| 7,086,155 B2 | 8/2006 | Chan et al. |
| 7,114,536 B2 | 10/2006 | Guthrie |
| 7,138,609 B2 | 11/2006 | Popeil et al. |
| 7,141,764 B1 | 11/2006 | Shumate |
| 7,142,922 B2 | 11/2006 | Spinelli et al. |
| 7,153,120 B2 | 12/2006 | Backus et al. |
| D535,164 S | 1/2007 | St. Germain et al. |
| 7,211,770 B2 | 5/2007 | Wilson |
| 7,225,729 B2 | 6/2007 | Backus et al. |
| 7,225,730 B2 | 6/2007 | Backus et al. |
| 7,229,656 B2 | 6/2007 | Paumen et al. |
| 7,237,476 B1 | 7/2007 | Bourgeois et al. |
| 7,237,582 B1 | 7/2007 | Harvey |
| 7,237,583 B2 | 7/2007 | Salani et al. |
| 7,240,701 B2 | 7/2007 | Salani et al. |
| D552,921 S | 10/2007 | Garman et al. |
| D553,432 S | 10/2007 | Lin |
| 7,284,581 B2 | 10/2007 | Steinweg |
| 7,302,976 B1 | 12/2007 | Bultman |
| 7,309,422 B2 | 12/2007 | Mullany, Jr. |
| 7,311,526 B2 | 12/2007 | Rohrbach et al. |
| D560,424 S | 1/2008 | McLemore |
| 7,322,386 B2 | 1/2008 | Holm |
| D563,719 S | 3/2008 | Fitzgerald |
| 7,351,066 B2 | 4/2008 | DiFonzo et al. |
| 7,412,922 B2 | 8/2008 | McLemore |
| D576,454 S | 9/2008 | Repac |
| 7,424,849 B2 | 9/2008 | Backus et al. |
| 7,442,042 B1 | 10/2008 | Lewis |
| 7,517,235 B2 | 4/2009 | Bagewadi et al. |
| 7,626,142 B2 | 12/2009 | Backus et al. |
| 7,641,477 B2 | 1/2010 | DiFonzo et al. |
| 7,645,143 B2 | 1/2010 | Rohrbach et al. |
| 7,736,151 B1 | 6/2010 | Yang |
| 7,739,948 B2 | 6/2010 | Backus et al. |
| 7,762,817 B2 | 7/2010 | Ligtenberg et al. |

(56) References Cited

U.S. PATENT DOCUMENTS

| | | |
|---|---|---|
| 7,771,202 B2 | 8/2010 | Amotz et al. |
| 7,901,216 B2 | 3/2011 | Rohrbach et al. |
| 7,931,472 B2 | 4/2011 | David et al. |
| 7,997,906 B2 | 8/2011 | Ligtenberg et al. |
| 8,087,939 B2 | 1/2012 | Rohrbach et al. |
| 8,177,560 B2 | 5/2012 | Rohrbach et al. |
| 8,186,265 B2 | 5/2012 | Popeil et al. |
| 8,309,151 B2 | 11/2012 | Popeil et al. |
| 8,348,678 B2 | 1/2013 | Hardisty et al. |
| 8,435,042 B2 | 5/2013 | Rohrbach et al. |
| 8,497,753 B2 | 7/2013 | DiFonzo et al. |
| 8,535,088 B2 | 9/2013 | Gao et al. |
| 9,301,644 B2 * | 4/2016 | Payen ................ A47J 37/0641 |
| 2002/0050212 A1 | 5/2002 | Backus et al. |
| 2004/0187702 A1 | 9/2004 | Xu |
| 2005/0051034 A1 | 3/2005 | Cheng |
| 2005/0055130 A1 | 3/2005 | Carlson et al. |
| 2005/0055533 A1 | 3/2005 | Kadambi et al. |
| 2005/0091050 A1 | 4/2005 | Surendran et al. |
| 2005/0144248 A1 | 6/2005 | Doganowski et al. |
| 2005/0144250 A1 | 6/2005 | Banatwala et al. |
| 2005/0151464 A1 | 7/2005 | Sung |
| 2005/0194372 A1 | 9/2005 | Lau et al. |
| 2005/0204929 A1 | 9/2005 | Rosenzweig |
| 2005/0207438 A1 | 9/2005 | Horiguchi et al. |
| 2005/0217662 A1 | 10/2005 | McDuffie |
| 2005/0229760 A1 | 10/2005 | Chang |
| 2005/0235838 A1 | 10/2005 | Cohn |
| 2005/0241492 A1 | 11/2005 | Kooyker et al. |
| 2005/0247454 A1 | 11/2005 | Domann et al. |
| 2005/0259309 A1 | 11/2005 | Blank |
| 2005/0266228 A1 | 12/2005 | Jain et al. |
| 2005/0268791 A1 | 12/2005 | Svabeck et al. |
| 2005/0268792 A1 | 12/2005 | Wu Chang |
| 2005/0269332 A1 | 12/2005 | Svabeck et al. |
| 2005/0272513 A1 | 12/2005 | Bissonnette et al. |
| 2005/0283335 A1 | 12/2005 | Banke, Jr. et al. |
| 2005/0284306 A1 | 12/2005 | Backus et al. |
| 2005/0289443 A1 | 12/2005 | Kuznetsov |
| 2006/0272633 A1 | 12/2006 | Osias, Jr. |
| 2007/0028780 A1 | 2/2007 | Popeil et al. |
| 2007/0028781 A1 | 2/2007 | Popeil et al. |
| 2007/0040559 A1 | 2/2007 | Klun |
| 2007/0054018 A1 | 3/2007 | Yuan |
| 2007/0145061 A1 | 6/2007 | Backus et al. |
| 2007/0221651 A1 | 9/2007 | Kristina et al. |
| 2007/0251517 A1 | 11/2007 | Sus et al. |
| 2007/0256571 A1 | 11/2007 | Popeil et al. |
| 2008/0041238 A1 | 2/2008 | Usui et al. |
| 2008/0102181 A1 | 5/2008 | Rao et al. |
| 2008/0124438 A1 | 5/2008 | Forte et al. |
| 2008/0153281 A1 | 6/2008 | Knollenberg et al. |
| 2008/0159281 A1 | 7/2008 | Jesseph |
| 2008/0169281 A1 | 7/2008 | Borovicka et al. |
| 2008/0196596 A1 | 8/2008 | Forrest et al. |
| 2008/0202349 A1 | 8/2008 | Peng |
| 2008/0210100 A1 | 9/2008 | Fraij et al. |
| 2008/0213447 A1 * | 9/2008 | Payen ................ A47J 37/043 <br> 426/438 |
| 2008/0265594 A1 | 10/2008 | Popeil et al. |

\* cited by examiner

SYSTEM AND METHOD FOR DEEP FRYING POULTRY WHILE AVOIDING SKIN DAMAGE

CROSS-REFERENCE TO RELATED APPLICATIONS AND INCORPORATION BY REFERENCE

This application relates to U.S. patent application Ser. No. 14/253,253, which is a Continuation-in-Part of U.S. patent application Ser. No. 13/072,391, filed Mar. 25, 2011, which is a Continuation-in-Part of U.S. patent application Ser. No. 12/904,803, filed Oct. 14, 2010, which is a Continuation-in-Part of U.S. patent application Ser. No. 12/856,230, filed Aug. 13, 2010 (issued as U.S. Pat. No. 8,309,151), which is a Continuation-in-Part of U.S. patent application Ser. No. 12/775,725, filed May 7, 2010 (issued as U.S. Pat. No. 8,186,265), which is a Continuation-in-Part of U.S. Ser. No. 12/251,019, filed Oct. 14, 2008 (issued as U.S. Pat. No. 8,850,965), which is a Continuation-in-Part of 1) U.S. patent application Ser. No. 11/345,187, filed Feb. 1, 2006, which claims the benefit of U.S. Provisional Application No. 60/706,859, filed Aug. 8, 2005; 2) U.S. patent application Ser. No. 11/425,317, filed Jun. 20, 2006 (issued as U.S. Pat. No. 8,707,857) which is a Continuation-in-Part of U.S. patent application Ser. No. 11/345,187, filed on Feb. 1, 2006, which claims the benefit of U.S. Provisional Application No. 60/706,859, filed Aug. 8, 2005; and 3) U.S. patent application Ser. No. 11/539,655, filed Oct. 9, 2006, which is a Continuation-in-Part of PCT Patent Application No. PCT/US2006/30946, filed Aug. 8, 2006, which is a PCT of U.S. patent application Ser. No. 11/425,317, filed Jun. 20, 2006, which is a Continuation-in-Part of U.S. patent application Ser. No. 11/345,187, filed Feb. 1, 2006, which claims the benefit of U.S. Provisional Application No. 60/706,859, filed Aug. 8, 2005, all of which are incorporated herein by reference.

Such incorporation by reference includes, but is not limited to methods and apparatuses for cooking unitary food articles, such as a whole fowl, in complementary cooking steps wherein a first portion of the fowl is immersed in hot fluid, such as cooking oil, for a first cooking period, and the fowl is then removed from the fluid, rotated and re-immersed such that the fluid contacts a portion of the fowl that was not previously cooked in the oil. See, for example, the description associated with the issued claims of U.S. Pat. No. 8,309,151.

TECHNICAL FIELD

This application relates generally cooking poultry. The application relates more particularly to safer deep frying of whole fowl with use of minimal cooking oil while maintaining a good appearance on an exterior surface of the fowl.

BACKGROUND

Poultry, such as chicken, turkey, duck or goose, is a hugely popular food item throughout the world. It is often seen as a more healthful meat alternative over beef or pork. Whole fowl are typically prepared by baking in ovens. Sometimes whole poultry, such as chicken, may be cooked by direct contact with heated a heated pan or via contact with a heated fluid such as hot air contacting a bird disposed over a grill as it rotates over a rotisserie. There are also popular cooking alternatives for fowl, such as chicken, when the whole bird is separated into breast, wings, thighs, ribs and legs. These alternatives include pan frying or deep frying in lard, oil, shortening or the like, which are fluids maintained at cooking temperatures. Steam frying, such as simultaneously with vegetables, is also used as a healthful cooking option.

More recently, deep frying has become more popular for large, whole fowl such as whole turkeys. Deep fried, whole turkeys are treasured for their great flavor. Early, whole bird deep fryers were designed for outdoor use and fueled by natural gas or propane. These fryers could be extremely dangerous when used improperly. For example, oil spillover could feed oil directly into an open flame causing ignition and spread of flaming oil. Placing a frozen bird, rather than fully thawed, room temperature bird could exacerbate oil boil over.

SUMMARY

In accordance with an example embodiment of the subject application, a system and method for cooking a food item, such as poultry, includes heating cooking fluid in a cooking vessel to a temperature sufficient to cook poultry and placing the poultry on a substantially horizontal perforate plate, breast down, such that the poultry is at least partially immersed in the cooking fluid. The perforate plate prevents poultry skin from sticking to a support, such as a deep fry cooking basket. The immersed poultry is cooked for a selected cooking period and then removed, along with the perforate plate from the cooking fluid. The poultry is then removed from contact with the perforate plate.

BRIEF DESCRIPTION OF THE DRAWINGS

Various embodiments will become better understood with regard to the following description, appended claims and accompanying drawings wherein:

DETAILED DESCRIPTION

Figure 1:
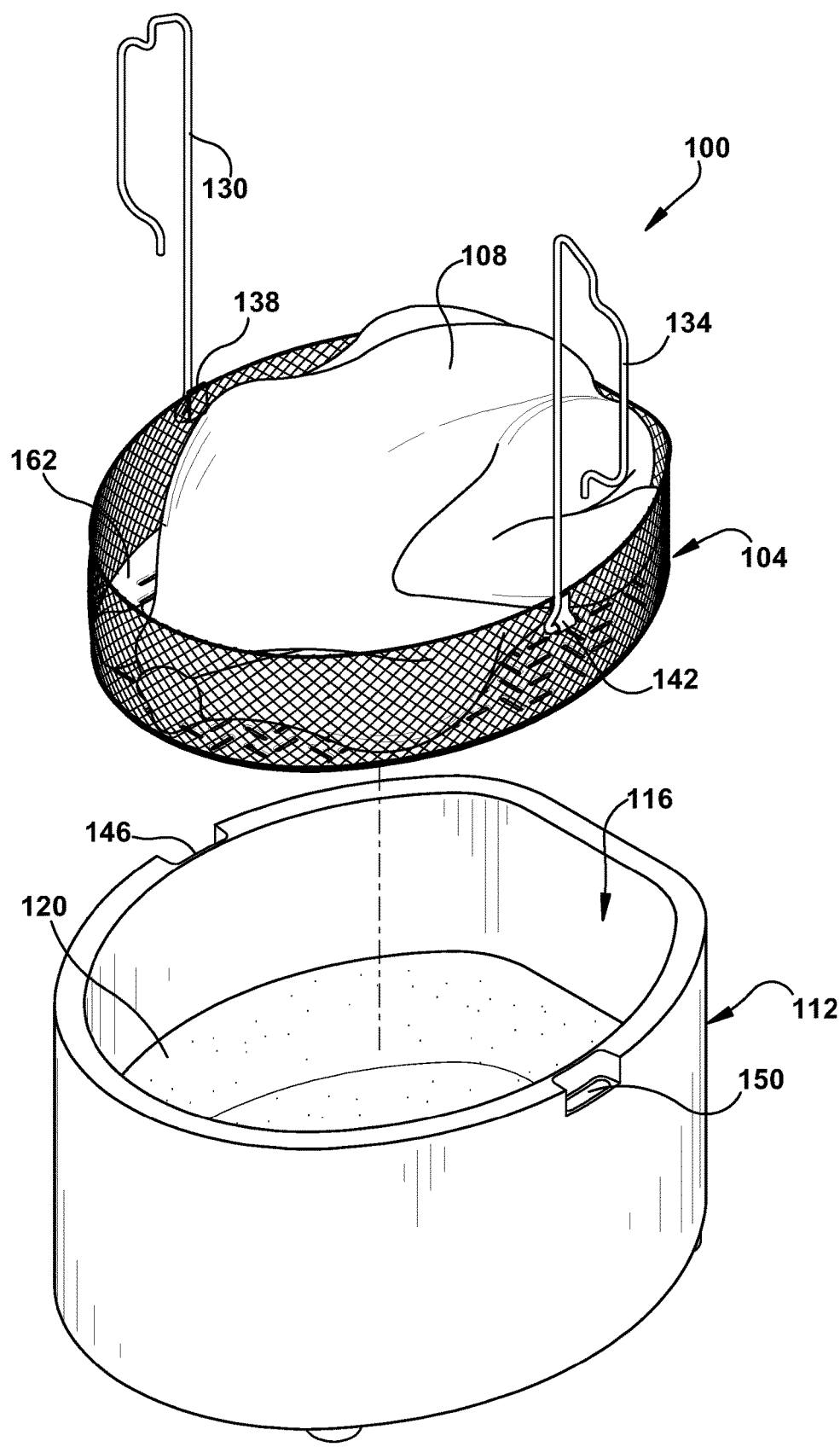
FIG. 1 an example embodiment of a poultry frying apparatus.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

The dangers of frying whole turkeys in hot oil cause significant public concern. It will be appreciated that while "turkey" is used herein, the concepts disclosed may apply to any unitary food article, particularly poultry or fowl. Concerns are even greater if one wishes to deep fry whole turkeys indoors. Underwriter Laboratories standards for consumer product certification, Section 1803, limit unitary articles of food, such as turkeys, to no more than 15 pounds with no more than 5 liters of oil for deep frying. Cooking an entire 20 lb. turkey fully immersed may require 3 gallons (11.35 liters) of oil. Cooking even a 14 lb. turkey, which is within UL 1083 guidelines, could require 2 gallons (7.57 liters) of oil, which over 50% more than allowed by those same guidelines. Thus, full immersion cooking for consumers is not available for turkeys in a desirable size range. In addition, there is substantial cost to purchasing larger quantities of oil, in addition to problems introduced with storing large quantities of oil for reuse.

The applications and patents noted above addressed the afore-noted concerns by teaching a poultry cooking mechanism and method that cook a full bird in multiple steps, cooking a portion of the bird at a time, reorienting the bird and performing a complementary cooking operation on the previously uncooked portion. Embodiments include cooking a bird in a vertical orientation, that is, with a longitudinal axis of the bird being oriented generally vertically. One cooking operation would have the neck area disposed at the bottom and the leg area above the fluid surface. A complementary cooking operation would have the leg area disposed at the bottom and the neck area disposed above the fluid surface. Use of a cooker disposed to operate in a vertical orientation allows for one that uses less counter surface space. Cooking a bird in a relative horizontal position suitably involves one operation with the breast portion above the cooking fluid and a complementary operation with the breast portion below the surface of the cooking fluid.

When a fowl is cooked as a whole, as opposed to being separated into parts such as breast, thighs, ribs, legs and wings, it is customary to have the bird on a platter, breast side up, where it is presented and provided for carving. Any visible damage to the skin or surface of the bird, especially with a large, exposed area such as associated with the breast portion, would create a disruption of aesthetics of the meal presentation and result in a lessened enjoyment. Also, intact skin of the bird prevents direct contact between more absorbent meat and hot cooking oil which can adversely affect the texture and nutritional quality of exposed meat. Use of conventional surfaces, such as the bottom of a wire cooking basket, to support a breast portion during cooking provides a substantial likelihood, if not near certainty, that damage to the breast skin will result due to sticking to the basket.

Figure 2:
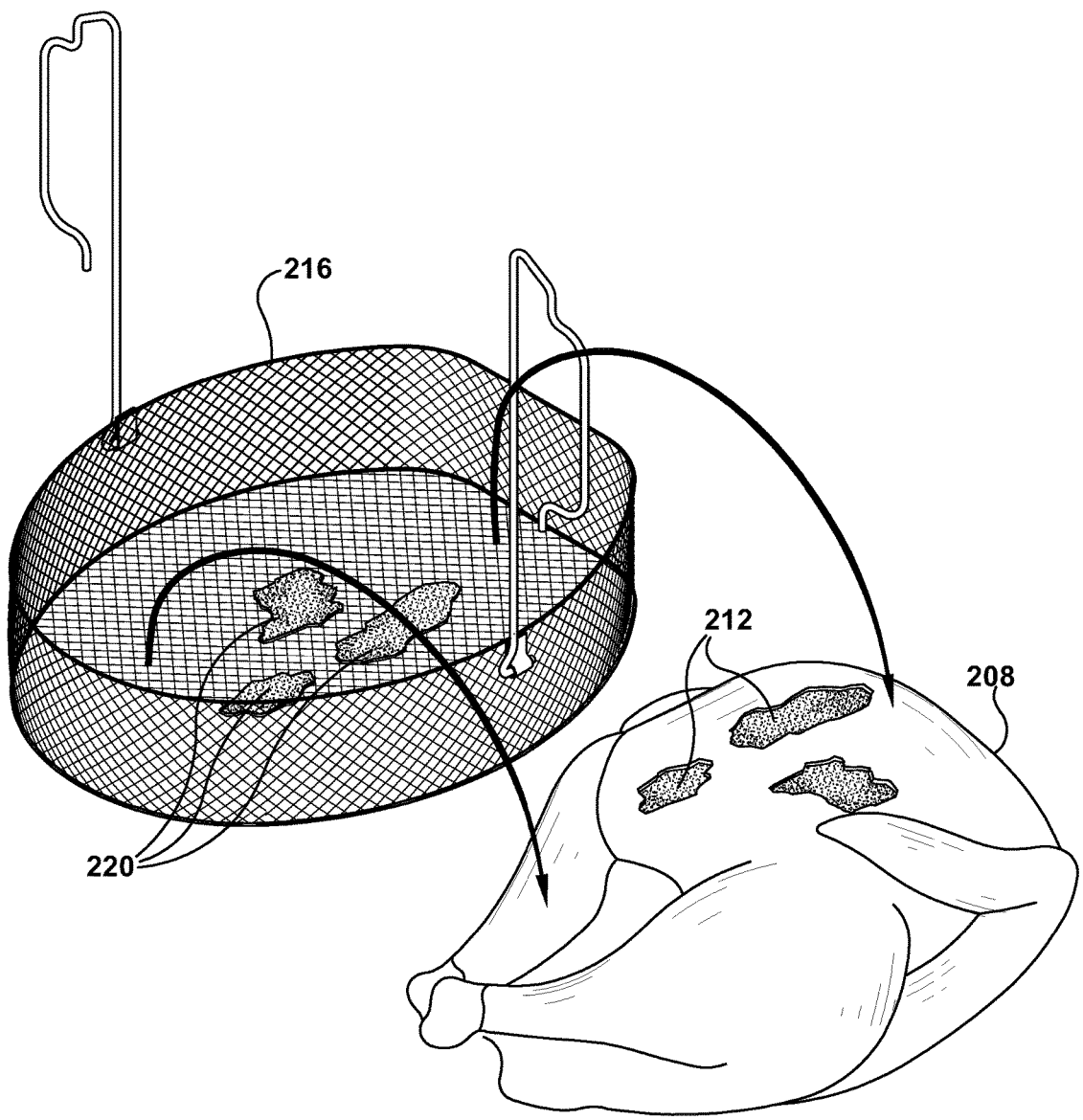
FIG. 2 is a prior art example of a fowl surface damaged during a cooking process.
Figure 3:
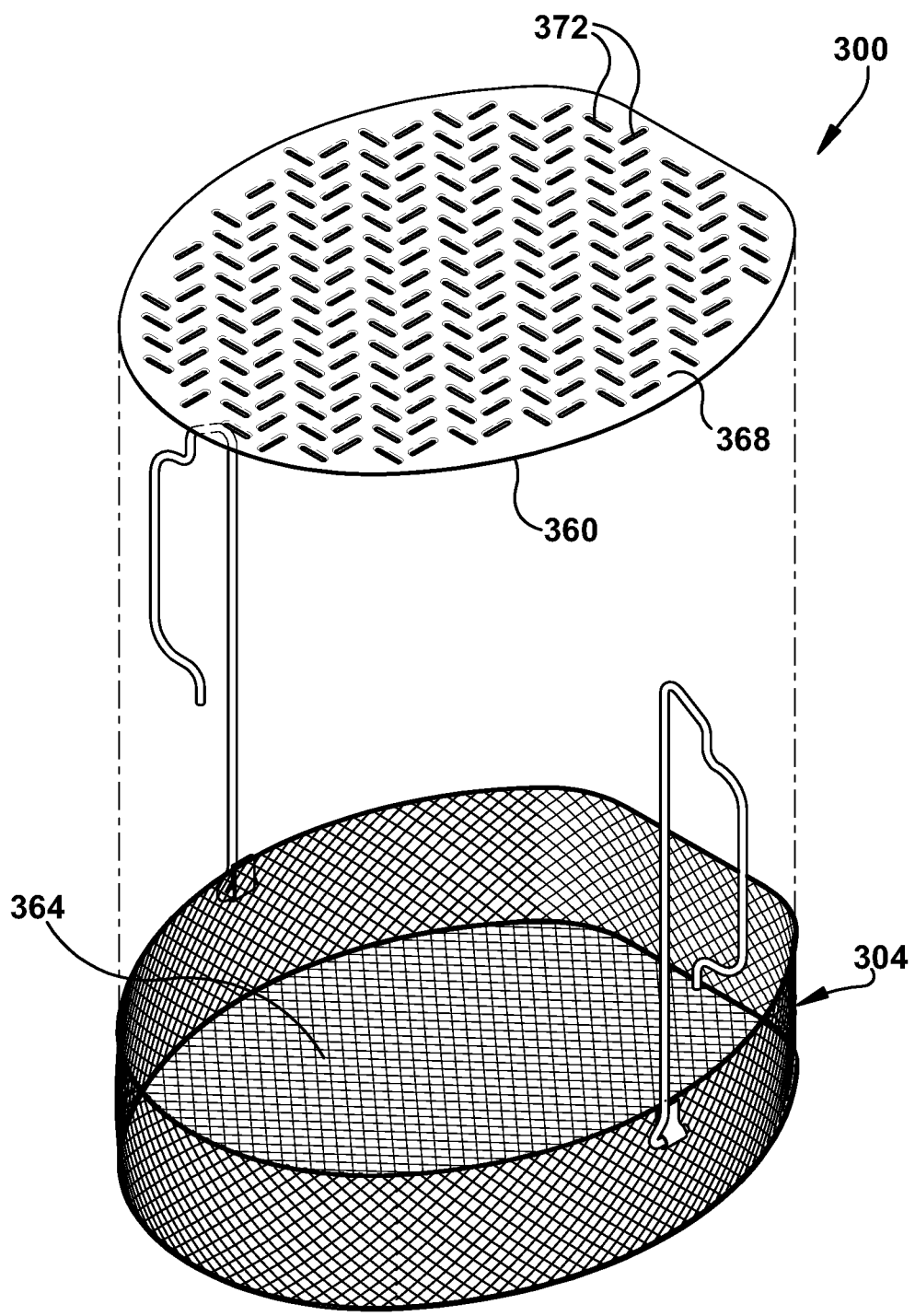
FIG. 3 is an example embodiment of a poultry support.

Referring to FIG. 1, illustrated is an example embodiment of a turkey frying apparatus 100 that includes a frying basket 104 into which turkey 108 is placed. A cooking vessel 112, or fryer, includes an interior 116 for holding a heated cooking fluid, such as cooking oil 120 although any suitable cooking fluid can be used including but not limited to lard, tallow, shortening, vegetable oil, peanut oil, and so forth as would be understood by one of ordinary skill in the art. Cooking oil 120 is heated by any suitable mechanism to a desired cooking temperature as will be appreciated by one of ordinary skill in the art. Frying basket 104 is suitably raised and lowered into cooking oil 120 via handles 130 and 134. Handles 130 and 134 are suitably removably attached to frying basket 104 at hinge connectors 138 and 142, respectively, and can pivot relative to basket 104. Handles 130 and 134 suitably engage cooking vessel 112 via connection points 146 and 150, respectively, such that basket 104 may be immersed into cooking oil 120, or raised above the cooking oil 120 and locked for draining purposes. In the illustrated embodiment, turkey 108 rests on a perforate plate 160 engineered to prevent sticking of the turkey skin as will be detailed further below. Referring additionally to FIG. 2, turkey 208 will be noted to have a damaged portion 212 that is addressed by implementation of perforate plate 162 of FIG. 1. In the illustration of FIG. 2, use of a conventional fry basket 216 results in skin portions 220 being ripped away from turkey 208 when the bird is removed Referring next to FIG. 3, illustrated is an example embodiment of a poultry support 300 that includes a frying basket 304 and a perforate plate 360 which is suitably placed at a bottom portion 364 of basket 304 prior to a frying operation. Thus, a cooking turkey would rest on a surface 372 of perforate plate 360 rather than directly on a mesh of basket 304. When a turkey is supported by a basket only, such as basket 304 without perforate plate 360, it will be noted that substantial portions of bird weight would be supported by wire mesh having a substantially small surface section. Concentrating weight on such as small surface results in deformation of skin surface of the turkey with unsupported surfaces being thrust into or through interstices of the wire mesh. This, coupled with heated wire surfaces, results in a sticking of skin to the wire mesh such that it tears away after a cooking operation and a portion remains affixed to the basket bottom as illustrated in FIG. 2, above. In addition to compromised aesthetics of a cooked bird, this also results in a difficult cleaning situation, such as one requiring that a basket be soaked in water for a period to loosen the attached skin sufficiently for removal.

In the illustration of FIG. 3, perforate plate 360 includes an array of elongated, generally cylindrical or oval perforations 368. It will be noted that perforations 368 are positioned relative to a surface 372 such that a significant portion of surface area remains relative to a combined area of perforations 368 as compared to a wire mesh such as illustrated with basket 304. Example embodiments comprise perforations 368 with a relative surface area of 20% to 80% complementary to solid surface area of the surface 372 of perforate plate 360. As relative area of the perforations 368 become less, there is less opportunity for oil to circulate to maintain consistent temperature levels throughout. Also, too small of perforate area may result in a rapid rise of oil level in a cooking vessel if a basket is lowered quickly, possibly subjecting the apparatus to oil overflow with its associated problems. In the example embodiment of FIG. 3, this potential concern is alleviated by retaining wire mesh on the sides of the basket 304, which do not impact a surface of the poultry, such as breast portion, and do not directly bear the weight of the poultry. By way of further example, with commonly used fowl weights and sizes, perforations 368 having sizes ranging from 1 mm to 10 mm, in any dimension, such as length or width of an oval or circle diameter, may be suitable. Non-smooth perforations, such as perforations that are triangular, rectangular (including square), pentagonal, hexagonal, etc. may also suitably be used.

Perforate plate 360 is selectively usable and may also be unused while a turkey is cooking with its legs contacting the basket bottom, as potential damage to these surfaces of the bird in this situation may be less aesthetically problematic. Perforate plate 360 is suitably placed within basket 304 during a cooking operation portion wherein the perforate plate 360 is supporting the weight of the turkey by contacting the breast portion. In the example embodiment of FIG. 3, it will be noted that the perforations 368 are oriented in a recurring chevron pattern. Any suitable pattern or perforation shape may be used and further example embodiments will be detailed below. Also, further protection from possible sticking of skin may be made by fabricating or treating a surface of perforate plate 360 so as to be non-stick. By way of further example, applying a cooking spray to surface 372 prior to an associated cooking operation may further protect skin from damage. Alternatively, or additionally, surface 372 may be suitably fabricated from a non-stick surface, such as polished metal or a surface treated with a nonstick coating such as polytetrafluoroethylene (PTFE), commonly known under the trademark TEFLON, or the like.

Figure 4:
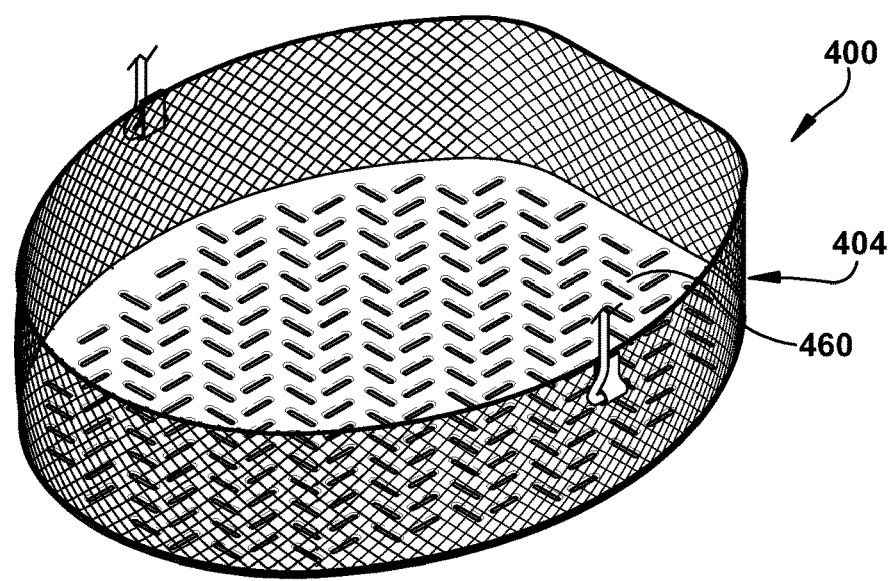
FIG. 4 is a first example embodiment of a cooking support.
Figure 5:
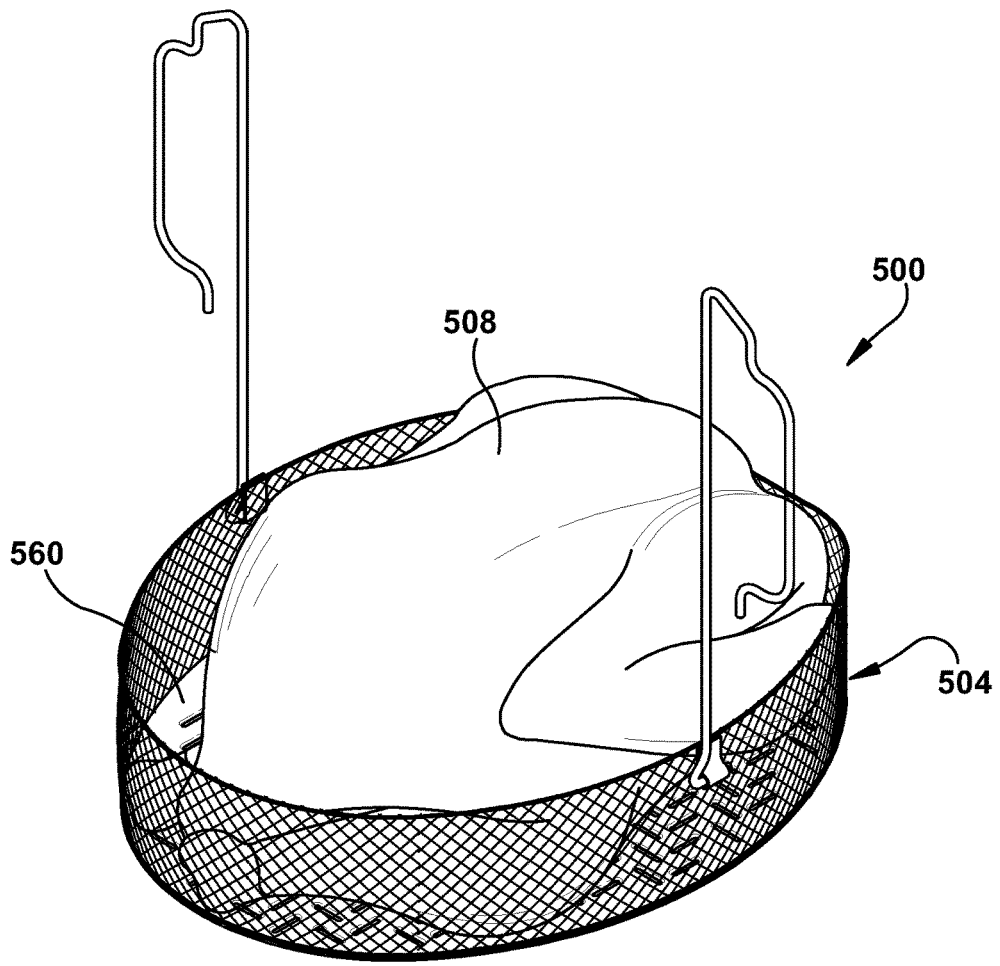
FIG. 5 is a second example embodiment of a cooking support.

FIG. 4 illustrates an example embodiment of a cooking support 400 comprised of cooking basket 404 into which perforate plate 460 has been placed at a bottom thereof. FIG. 5 illustrates an example embodiment of a cooking support 500 that includes fry basket 504 into which has been inserted perforate plate 560 which supports turkey 508.

Figure 6:
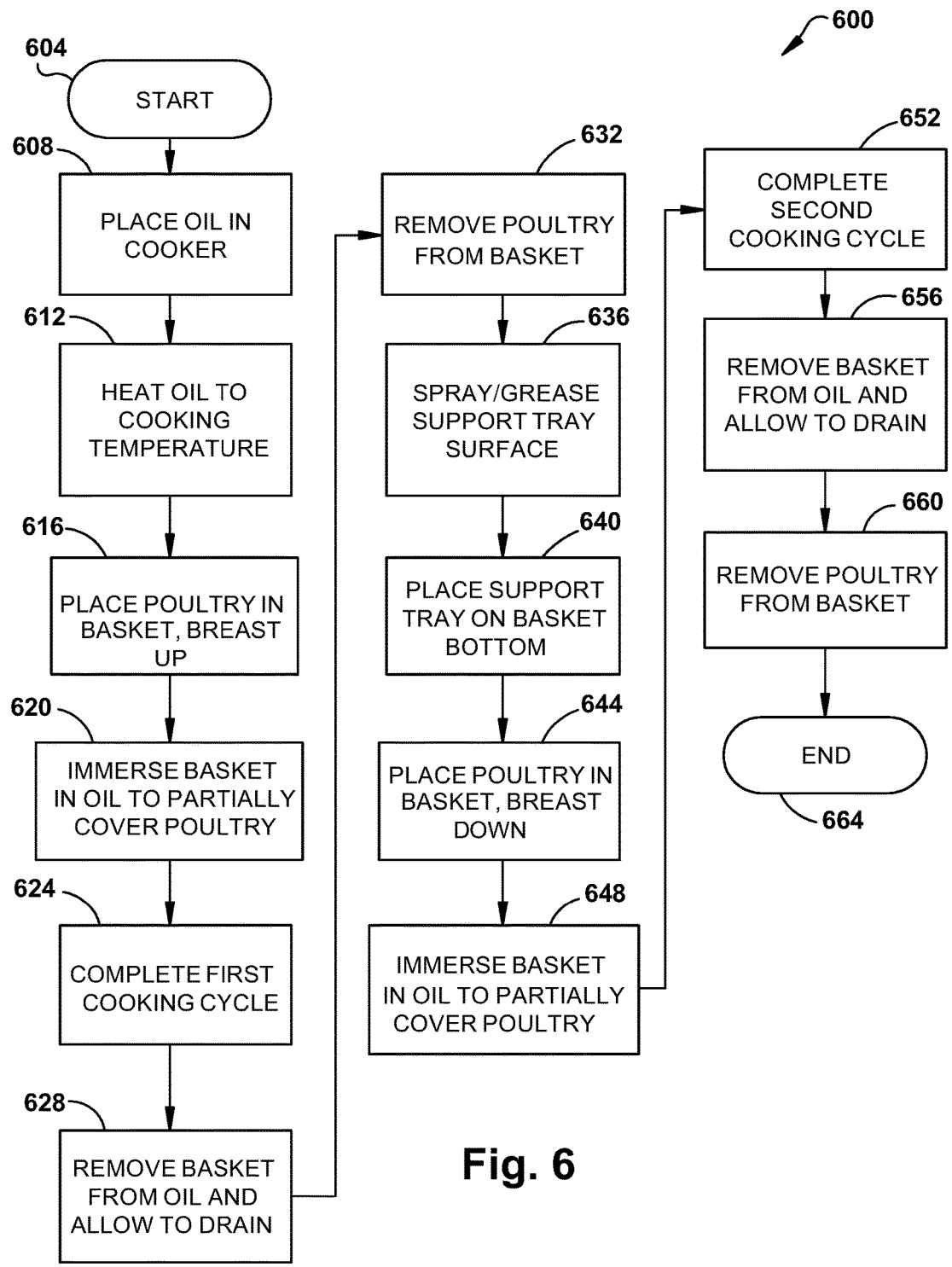
FIG. 6 is an example cooking procedure according to an embodiment of the disclosure.

FIG. 6 illustrates an example cooking procedure 600 that prevents damage of skin surfaces, such as turkey breast skin. The process commences at block 604 and oil is placed in a cooker at block 608. The oil is heated to a desired cooking temperature at block 612 and poultry, such as a turkey, is placed in a cooking basket, breast up, at block 616. The basket is immersed in cooking oil at block 620 so as to cover a bottom portion of the turkey. A first cooking cycle is completed at block 624. The cooking basket, containing the turkey, is removed at block 628 and the turkey is allowed to drain. The turkey is removed from the basket at block 632 and spray or grease is suitably applied to a surface of a perforate support tray at block 636. The tray is then place at the bottom of the cooking basket at block 640 and the turkey, breast down, is placed in the in the basket on the tray at 644. The basket is again immersed in the oil at block 648 to cook a complementary portion to complete cooking of the turkey and a second cooking cycle is completed at block 652. The basket is removed from the oil at block 656 and the turkey allowed to drain. The turkey is removed from the basket (and tray) at block 660 and the process is completed at block 664.

Figure 8:
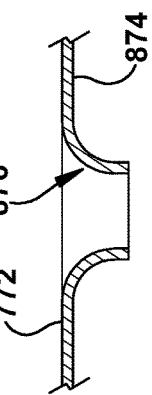
FIG. 8 is an example embodiment of a sloped perforation of the perforate plate of FIG. 7.
Figure 7:
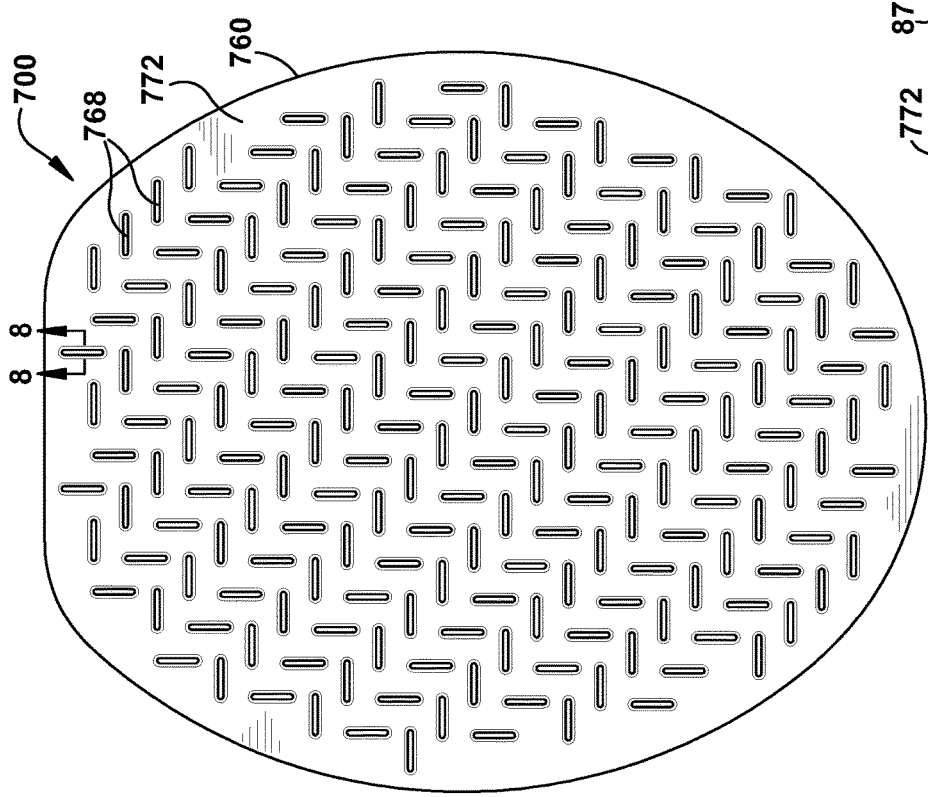
FIG. 7 is a first example embodiment of a perforate plate.

FIG. 7 is a plan view 700 of an example embodiment of a perforate plate 760. In the illustrated embodiment, a plurality of perforations 768 is provided in a surface 772. In this example, perforations 768 include sloped walls as illustrated by FIG. 8 which is a sectional view along 8-8 of FIG. 7. Perforations slope past a bottom surface 874. Top surface 772 contacts turkey skin and pressure from weight of the turkey and perforations slope past bottom surface 874 against a continuous, sloped wall 876. This minimizes opportunity for skin to stick to the top surface 772.

Figure 9:
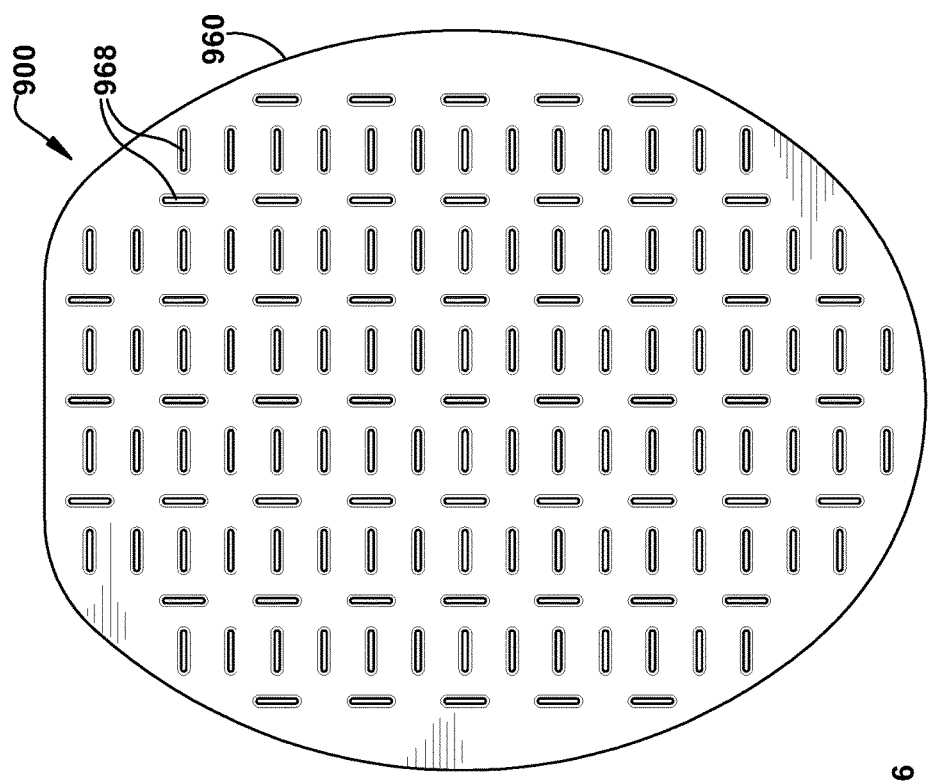
FIG. 9 is a second example embodiment of a perforate plate

FIG. 9 is a plan view 900 of another example embodiment of perforate plate 960 wherein perforations 968 are arrayed in a cross hatch pattern. Perforations 968 can be suitably sloped as illustrated with FIGS. 7 and 8, above.

Figure 10:
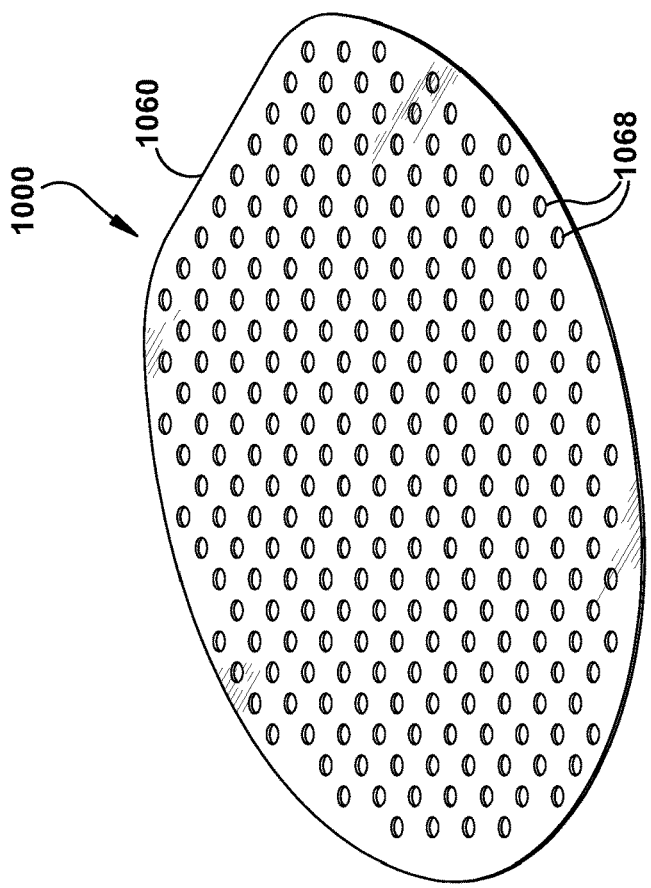
FIG. 10 is a third example embodiment of a perforate plate.

FIG. 10 is a perspective view 1000 of an example embodiment of a perforate plate 1060 wherein perforations 1068 are circular and arranged in a grid pattern. Perforations 1068 can be suitably sloped as illustrated with FIGS. 7 and 8, above.

Figure 11:
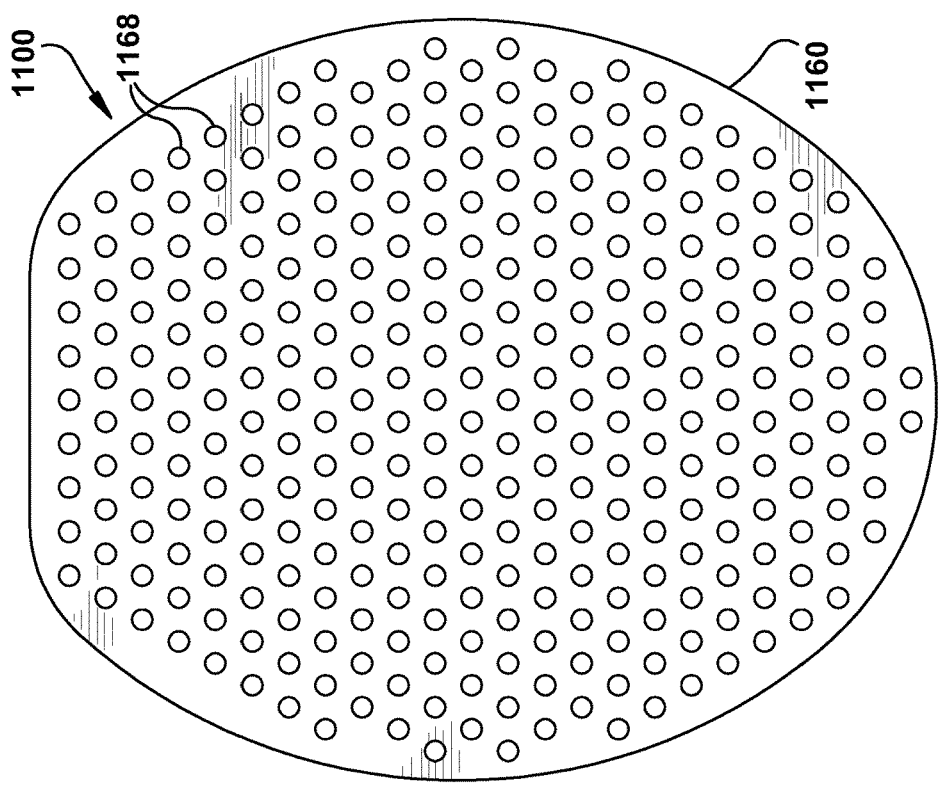
FIG. 11 is a fourth example embodiment of a perforate plate.

FIG. 11 is a plan view 1100 of an example embodiment of a perforate plate 1160 wherein perforations 1168 are circular and arranged in an offset grid pattern. Perforations 1168 can be suitably sloped as illustrated with FIGS. 7 and 8, above.

Figure 12:
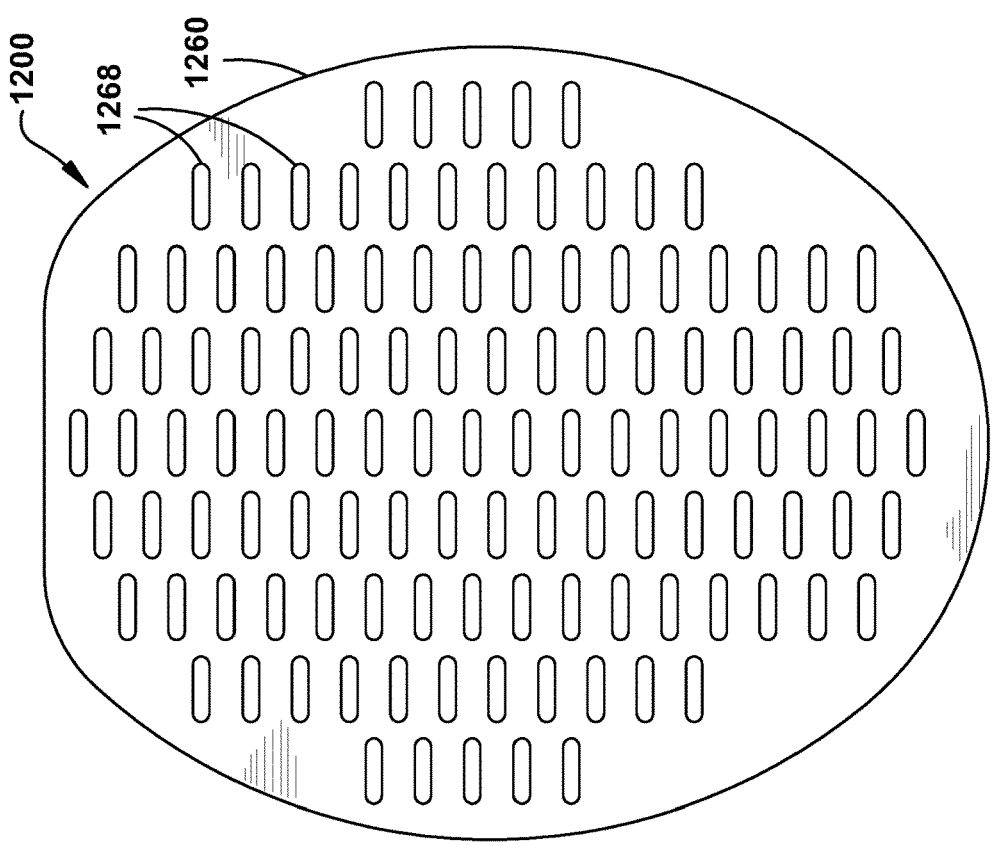
FIG. 12 is a fifth example embodiment of a perforate plate.

FIG. 12 is a plan view 1200 of an example embodiment of a perforate plate 1260 wherein perforations 1268 are comprised of generally elongated, rounded or oval holes. Perforations 1268 can be suitably sloped as illustrated with FIGS. 7 and 8, above.

Figure 13:
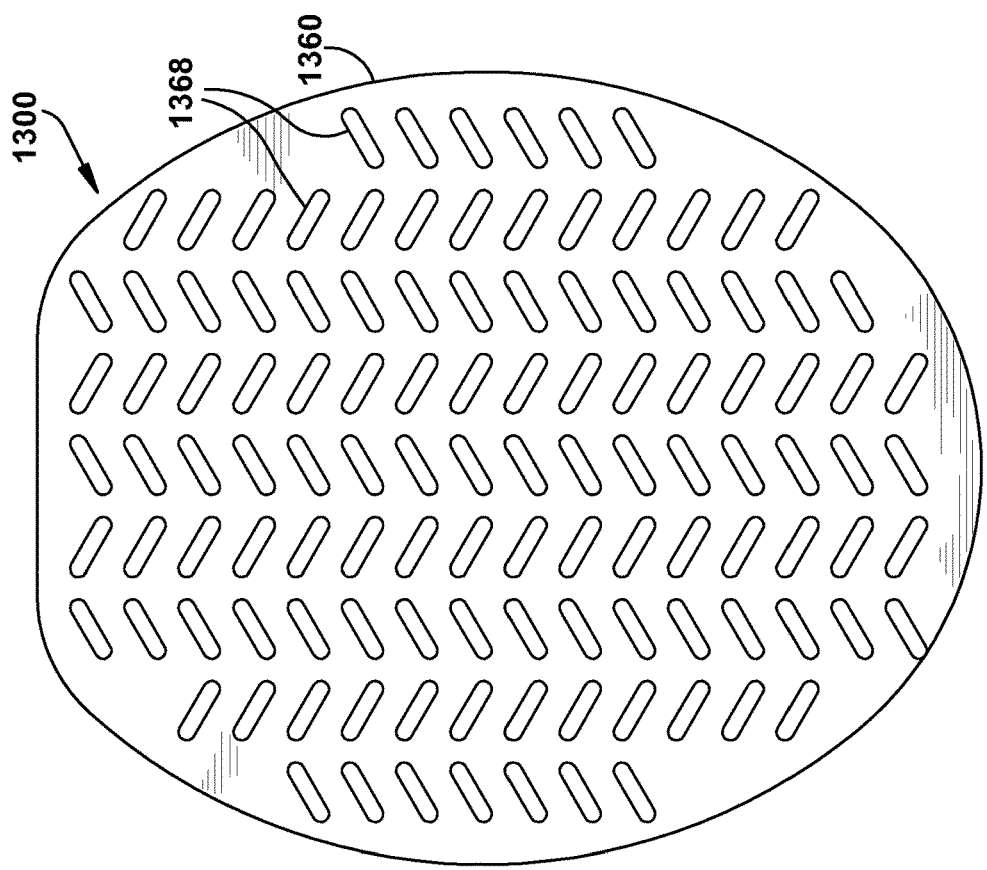
FIG. 13 is a sixth example embodiment of a perforate place.

FIG. 13 is a plan view 1300 of an example embodiment of a perforate plate 1360 wherein perforations 1368 are comprised of generally elongated, rounded or oval holes. Perforations 1268 can be suitably sloped as illustrated with FIGS. 7 and 8, above.

Figure 14:
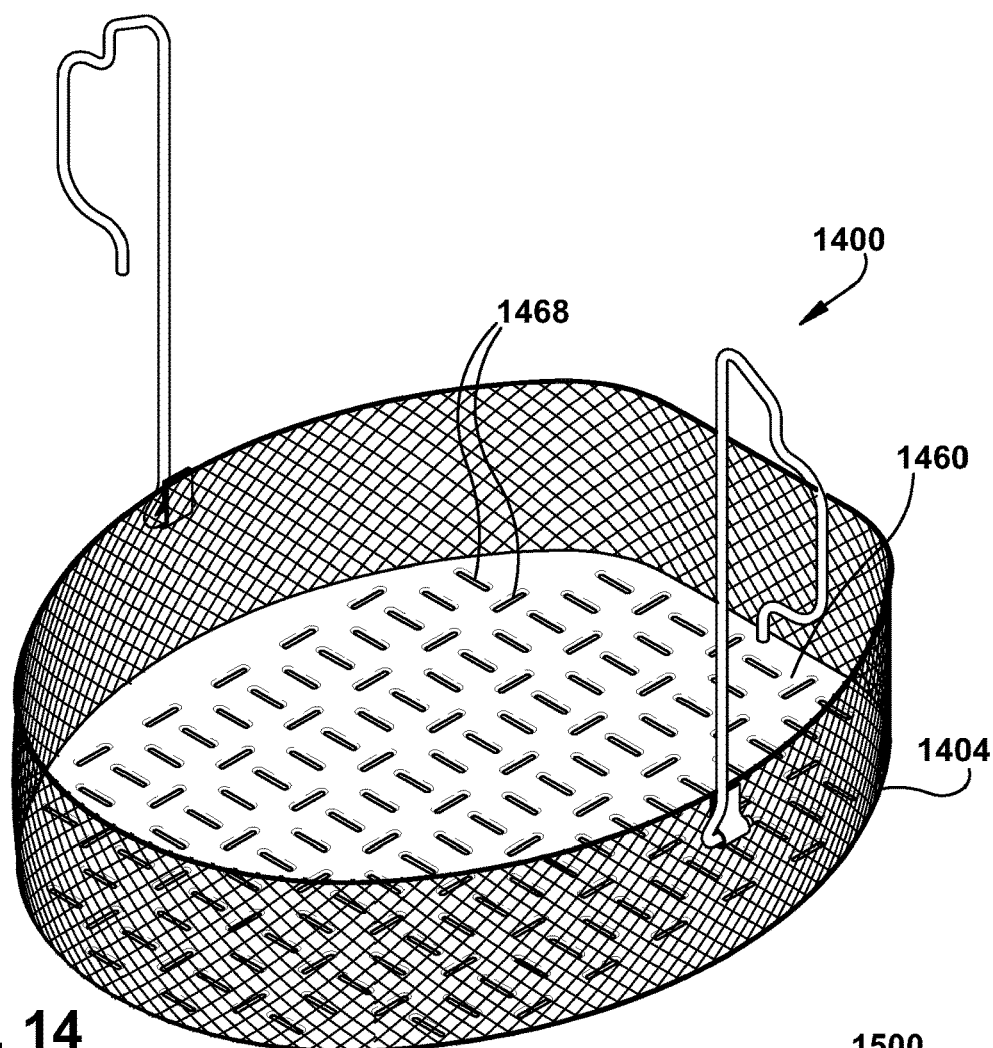
FIG. 14 is a third example embodiment of a cooking support.

FIG. 14 illustrates an example embodiment of cooking support 1400 wherein cooking basket 1404 has an integrated perforate plate 1460 forming a bottom thereof. Perforations 1468 are illustrated as elongated openings, but it will be appreciated that any suitable perforation as disclosed herein or its equivalent, is suitably implemented. Such an example embodiment of a basket with an integrated, bottom perforate plate 1460, allows for elimination of a step of adding a perforate tray to a cooking basket bottom prior to performing a cooking operation. However, fabrication of a fry basket having a bottom formed as a perforate plate may be more expensive than a standard basket with a drop-in perforate plate. There are other factors that may be taken into consideration relative to an integrated, versus drop-in, perforate plate.

With a cooking basket 1404 having an integrated perforate plate 1460, both complementary cooking operations, that is, cooking the bottom portion of the bird and then the top portion of the bird, would utilize the perforate plate 1460 at the bottom of the cooking basked to support the bird. A perforate plate 1460 may not have the same freedom of fluid circulation through it relative to a more conventional fry basket bottom. In certain applications, it may be advantageous to have better circulation and heat transfer. By way of example, a bottom portion of a fowl comprises thighs and legs, which are considered dark meat which may be conducive to cooking with higher heat or for longer periods of time. Therefore, performing this cooking step using a mesh basket without a perforate plate can be advantageous. Conversely, a top portion of a fowl comprises a breast, ribs and wings, which are considered white meat which may be conducive to cooking with lower heat or for shorter periods of time, particularly when the white meat portion is cooked as a second step after having already been subject to warming during cooking of the bottom portion of the bird. For this cooking step, cooking with a perforate plate in place at the bottom of the basket can be advantageous.

From the forgoing, it will be understood that any suitably arrangement of perforations of any suitable construct can be used. Particular designs are contingent on accommodating fowl of various sizes or weights and are suitably engineered accordingly.

Figure 15:
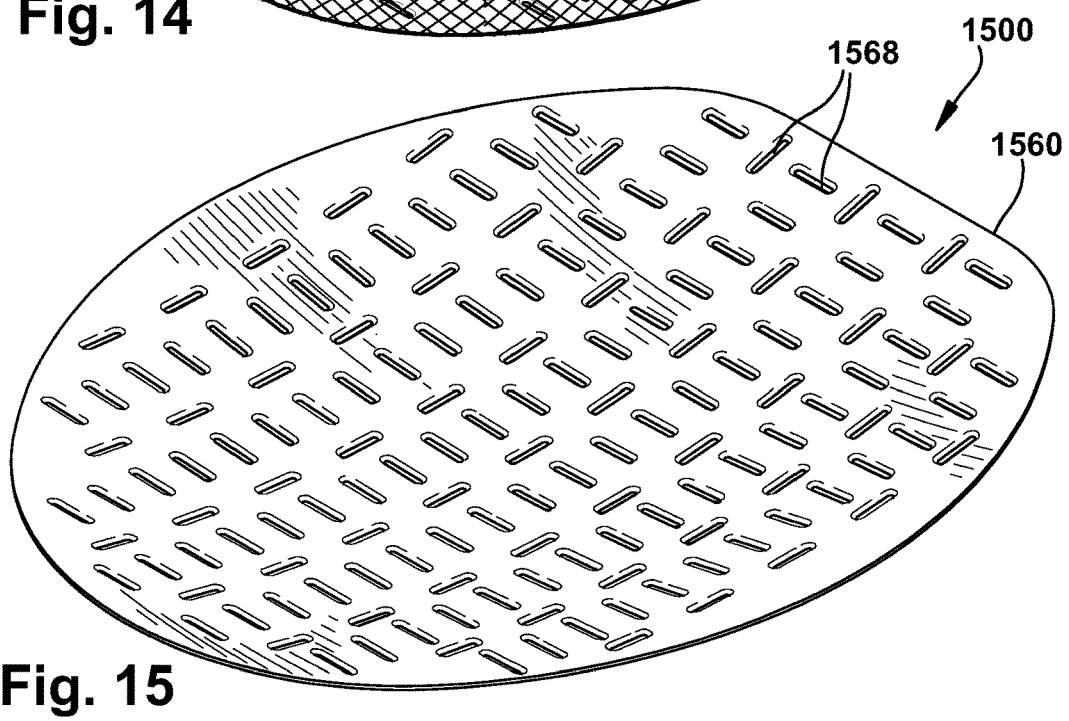
FIG. 15 is a seventh example embodiment of a perforate place.

FIG. 15 illustrates an example embodiment of a food support 1500 comprised of perforate plate 1560 that includes suitable perforations, such as illustrated by perforations 1568. In this example embodiment, perforate plate 1560 is curved in a convex shape. Such curvature provides for added contact area against a curved surface, such as that with a turkey breast. Greater contact area results in more even distribution of weight and thus less pressure per unit area, thus lessening even further opportunity for skin to stick to a surface.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A method comprising:
heating cooking fluid in a cooking vessel to a temperature sufficient to cook poultry;
placing poultry on a substantially horizontal perforate plate, breast down, such that the poultry is at least partially immersed in the cooking fluid, wherein the perforate plate forms at least a portion of a bottom wall of a cooking basket;
cooking the at least partially immersed poultry for a selected cooking period;
removing the poultry and perforate plate from the cooking fluid; and
removing the poultry from contact with the perforate plate.

2. The method of claim 1 further comprising applying a non-stick lubricator to the perforate plate prior to placing the poultry on the perforate plate.

3. The method of claim 2 further comprising placing the perforate plate in a cooking basket prior to placement of the poultry on the perforate plate such that the cooking basket is at least partially immersed in the cooking fluid and the perforate plate is fully immersed in the cooking fluid.

4. The method of claim 3 wherein the cooking fluid flows into the cooking basket through sides of the cooking basket that are substantially open wire mesh and through a plurality of openings in the perforate plate that range from approximately 1 mm to approximately 10 mm.

5. The method of claim 1 further comprising placing the perforate plate in a cooking basket prior to placement of the poultry on the perforate plate such that the cooking basket is at least partially immersed in the cooking fluid and the perforate plate is fully immersed in the cooking fluid.

6. The method of claim 1 wherein the perforate plate comprises an integrated non-stick surface contacting the poultry during cooking.

7. The method of claim 6 wherein the nonstick surface comprises polytetrafluoroethylene.

8. A method comprising:
heating cooking fluid in a cooking vessel to a temperature sufficient to cook poultry;
placing poultry substantially horizontally in a frying basket, breast up, such that the poultry is at least partially immersed in the cooking fluid;
cooking the immersed poultry for a first selected cooking period;
removing the immersed poultry from the cooking fluid after the first selected cooking period;
placing the poultry on a substantially horizontal perforate plate that forms at least a portion of a bottom wall of the frying basket, breast down, such that the poultry is at least partially immersed in the cooking fluid;
cooking the at least partially immersed poultry for a second selected cooking period;
removing the poultry and perforate plate from the cooking fluid after the second selected cooking period; and
removing the poultry from contact with the perforate plate.

9. The method of claim 8 further comprising applying a non-stick lubricator to the perforate plate prior to placing the poultry on the perforate plate.

10. The method of claim 9 further comprising placing the perforate plate at a bottom of the frying basket prior to placing the poultry on the perforate plate.

11. The method of claim 10 further comprising removing the poultry and perforate plate from the cooking fluid by grasping a handle on the frying basket disposed above the cooking fluid so as to raise the frying basket, perforate plate and poultry simultaneously.

12. The method of claim 8, wherein during the second selected cooking period the cooking fluid flows into the frying basket through sides of the frying basket that are substantially open wire mesh and through a plurality of openings in the perforate plate that range from approximately 1 mm to approximately 10 mm.

13. A system comprising:
a cooking vessel configured to receive and heat cooking fluid to a temperature sufficient to cook poultry; and
a frying basket having a perforate exterior and a top opening configured to receive a poultry so as to rest on a bottom surface of the frying basket,
a perforate plate food support that includes a plurality of openings therethrough ranging from approximately 1 mm to approximately 10 mm, wherein the openings comprise a beveled rim oriented to flare away from the poultry placed thereon,
wherein the cooking vessel is configured to receive the frying basket through a top opening of the cooking vessel,
wherein the frying basket is configured to receive a perforate plate through the top opening so as to rest generally horizontal on the bottom surface,
wherein the perforate plate is configured to support a breast of the poultry disposed in the frying basket when the poultry is generally horizontal in a breast down orientation, and
wherein the cooking vessel is configured to support the poultry disposed in the frying basket such that a first portion of the poultry is cooked within the cooking fluid while a second portion of the poultry is disposed above a surface of the cooking fluid.

14. The system of claim 13 wherein
the frying basket is configured to receive the poultry disposed in the frying basket in a generally horizontal, breast up orientation, and
wherein the cooking vessel is configured to support the poultry disposed in the frying basket in the generally horizontal, breast up orientation so as to cook the second portion disposed within the cooking fluid while the first portion is disposed above the surface of the cooking fluid.

15. The system of claim 14 further comprising a perforate plate comprised of a nonstick surface.

16. The system of claim 14 further comprising a perforate plate configured to receive an application of nonstick coating on a surface thereof.

17. The system of claim 14 where the openings comprise a plurality of slits.

\* \* \* \* \*